United States Patent [19]

Lester

[11] Patent Number: 5,139,230

[45] Date of Patent: Aug. 18, 1992

[54] TRAVEL STOP ASSEMBLY FOR VALVES

[75] Inventor: Leo M. Lester, Medford, Mass.

[73] Assignee: Asahi/America, Inc., Mass.

[21] Appl. No.: 738,455

[22] Filed: Jul. 31, 1991

[51] Int. Cl.$^5$ .......................... F16K 5/08; F16K 51/00
[52] U.S. Cl. ..................................... 251/285; 251/286
[58] Field of Search ...................... 251/285, 286, 288

[56] References Cited

U.S. PATENT DOCUMENTS

| | | | |
|---|---|---|---|
| 908,717 | 1/1909 | Westwater | 251/286 |
| 1,943,865 | 1/1934 | Hennessey | 251/285 X |
| 3,107,546 | 10/1963 | Rowland | 251/288 X |
| 3,674,048 | 7/1972 | Manoogian et al. | 251/288 X |
| 4,423,752 | 1/1984 | Psarouthakis | 251/288 X |
| 4,714,235 | 12/1987 | Brown et al. | 251/288 |

FOREIGN PATENT DOCUMENTS 0350596  1/1990  European Pat. Off. ............ 251/285

Primary Examiner—John Rivell
Attorney, Agent, or Firm—Anthony J. Casella; Gerald E. Hespos

[57] ABSTRACT

A travel stop assembly is provided for a valve and an actuator. The travel stop assembly includes a coupling which can be non-rotatably engaged between the valve stem and the actuator shaft to transmit rotation from the actuator shaft to the valve stem. The coupling includes a flange intermediate its length with a pair of opposed stop surfaces thereon. A pair of threadedly adjustable bolts are mounted intermediate the valve and the actuator for threaded advancement toward or away from the coupling. The bolts are angularly aligned to one another and can be independently advanced or retracted to engage the stop surfaces of the flange on the coupling to control the maximum rotation of the coupling and hence the valve stem.

4 Claims, 2 Drawing Sheets

TRAVEL STOP ASSEMBLY FOR VALVES

BACKGROUND OF THE INVENTION

Pipe systems often include complex arrays of closely spaced pipes which circuitously pass through manufacturing, refining or research facility. The pipes often are very close to one another along at least portions of their respective lengths. Valves are disposed at selected locations along the pipes to control the flow of fluid. Each valve includes a housing having opposed longitudinal ends and a flow passage extending therebetween. The ends of the valve housing are connectable respectively to axially aligned pipes. A valving member is mounted in the housing between the opposed ends for selectively blocking the flow of fluid through the housing.

Butterfly valves and ball valves are widely used in industry. The valving member of a butterfly valve is a generally planar disc rotatably mounted in the housing. In one rotational orientation the plane of the disc is aligned along the axis of the flow passage in the valve housing to enable fluid to flow on either side of the disc. In another rotational orientation the plane of the disc is orthogonal to the axis of the flow passage to completely block the flow of fluid through the valve housing. The valving member of a ball valve is a ball rotatably mounted in the valve housing. A flow passage extends diametrically through the ball and defines a cross-section substantially the same as the flow passage through the valve housing. In a first rotational orientation of the ball, the flow passage through the ball is coaxial with the flow passage in the valve housing to permit a flow of fluid through the housing. In a second rotational orientation the flow passage through the ball is orthogonal to the flow passage through the valve housing. Thus, a continuous spherical surface on the ball blocks the flow of fluid through the valve.

The disc in the prior butterfly valve and the ball in the prior art ball valve each are rigidly mounted to a valve stem which extends through the valve housing substantially orthogonal to the axis of the flow passage. A rotation of the valve stem causes a corresponding rotation of the disc or ball for selectively opening or closing the flow passage through the housing of the prior art valve. The valve stem and the valve housing of the prior art butterfly valve and the prior art ball valve generally are constructed with stops to enable only 90° of rotation of the valve stem. Thus, a valve being moved from the open position toward the closed position will be prevented from being rotated beyond the closed position back into a fully opened position. Similarly, a valve being rotated from the closed position toward the open position will be prevented from rotating beyond the partly open position into a partly closed position. However, the valve stem can be stopped at any point within this 90° range of motion to achieve a partly opened or partly closed condition.

Complex systems of pipes generally require precise on-off sequencing of valves. To achieve precise control, the prior art pipe systems include actuators that are operatively connected to the respective valves. For example, the prior art valve housing may include a bracket in proximity to the valve stem. The prior art actuator may be mounted to the bracket of the prior art valve housing, and includes a shaft that can be operatively connected to the valve stem. The typical prior art actuator is pneumatically operated to rotate the actuator shaft and the valve stem through the 90° permitted by the stops on the prior art valve stem or valve housing. A substantial number of actuators employed in a complex prior art pipe system may be simultaneously operated such that a first plurality of valves in the system are simultaneously opened while a second plurality of valves in the system are simultaneously closed. An extremely effective prior art actuator is shown in U.S. Pat. No. 4,556,194 which issued to van Lingen on Dec. 3, 1985 and which is assigned to the assignee of the subject invention. The disclosure of U.S. Pat. No. 4,556,194 is incorporated herein by reference.

System operational considerations may require certain valves within a complex pipe system to be only partly opened or partly closed. For example, it may be desirable to have a valve slightly opened to prevent an excessive build-up of pressure within a system. Alternatively, it may be desireable to have a valve slightly less than fully open to reduce the maximum flow rate of fluid through the valve. In still other situations it may be desireable to more significantly affect the flow of fluid through the valve. For example, it may be necessary or desireable to have a valve operate only between a substantially fully closed position and a half-opened position. Specially manufactured valve housings or valve actuators can be provided for these purposes. However, the specialty valves and actuators are extremely expensive. Furthermore, the exact degree of opening or closing often may not be known until the system is tested or calibrated, and it may be desireable to change certain valve operational limits from time to time. It also is more desireable and more cost efficient to use off-the-shelf components.

The prior art has included travel stops that can be retrofitted to the portion of a valve actuator facing away from the valve housing. In particular, a prior art actuator can be partly disassembled in the field, and a cam can be mounted to the actuator shaft to extend beyond the portion of the actuator facing away from the valve housing. The prior art actuator cam is provided with first and second cam faces extending radially outwardly and separated from one another by 90°. This prior art actuator is further retrofitted with a pair angle brackets having a pair of parallel bolts threadedly engaged therein. The parallel bolts extend orthogonal to the direction of fluid flow through the valve and on the portion of the actuator facing away from the valve. The parallel bolts are disposed to engage the respective first and second cam faces of the cam retrofitted to the actuator shaft as the respective cam faces are rotated toward an alignment parallel to the direction of flow through the valve. Advancement of either of the parallel bolts can prevent the corresponding cam face of the retrofitted cam from reaching an alignment where it is perfectly parallel to the direction of fluid flow through the prior art valve. In this manner, the parallel bolts retrofitted to this prior art actuator can prevent the actuator from completely closing the associated valve or from completely opening the associated valve.

This prior art travel stop has several deficiencies. First, the alignment of the bolts parallel to one another and orthogonal to the direction of flow substantially limits the range of adjustments. In particular, one or both cam faces will have to undergo substantial rotation before contacting even a fully advanced bolt. Thus, for example, this prior art actuator and stop assembly may not be helpful if it is desired to ensure that the valve rotates only from a fully closed position to a slightly opened position. Second, the parallel alignment of the adjustable bolts in the prior art apparatus is such that the bolts will be contacted from the side when the bolts are rotated into more fully advanced positions. Consequently, substantial bending moments will be exerted on each bolt during each actuation of the valve. The bending moments can cause deformation and breakage of the bolts with substantial down time for an entire chemical or petrochemical processing system. Thus, these prior art travel stop devices are not well suited for systems where a full range of control of the valve is desired.

In addition to these operational limitations, the disposition of the prior art travels stop on the side of the actuator opposite the valve can create problems. First, the location of the prior art travel stop can create significant torsional forces on the actuator shaft. In this regard, one end of the elongated actuator shaft will exert forces on the valve stem, while the other end of the elongated actuator shaft will have forces exerted on it by the prior art travel stop mechanism. Additionally, the disposition of the prior art stop mechanism on the side of the actuator opposite the valve adds to the total space required for the prior art valve and actuator assembly. As noted above, pipes often are very close in many industrial facilities and significant expansion of the space envelope required for the prior art travel stop assembly may not be possible. Furthermore, many pipe systems are employed in environments where an accumulation of dirt or debris is possible. A stop mechanism disposed on a portion of the actuator facing away from the valve is exposed and hence susceptible to an accumulation of debris that could alter the performance of this prior art travel stop assembly.

In view of the above, it is an object of the subject invention to provide a travel stop assembly for adjusting the rotation of a valve through a full range of rotational orientations between a fully closed position and a fully opened position.

It is another object of the subject invention to provide a travel stop assembly that can be employed with available valves and available actuators.

An additional object of the subject invention is to provide a travel stop assembly disposed to avoid interference with adjacent valves, pipes or fittings.

A further object of the subject invention is to provide a travel stop assembly that is substantially protected from an accumulation of dirt or debris that could affect the operation of the valve and the actuator.

Yet another object of the subject invention is to provide a travel stop assembly for an actuated valve where the adjustable components are not subjected to excessive bending moments at either end of their range of adjustments.

SUMMARY OF THE INVENTION

The subject invention is directed to an adjustable travel stop for an valve assembly. The valve assembly includes a valve which comprises a housing with a valving member disposed therein. The valving member is operatively connected to a valve stem which extends through the valve housing and which is rotatable relative to the valve housing for moving the valving member from an open position to a closed position.

The valve assembly may further include an actuator with means for rotating the valve stem of the valve. More particularly, the actuator may include a rotatable drive shaft which may be operative to selectively rotate the valve stem. The actuator may be electrically powered, pneumatically powered, hydraulically powered or manually powered. The valve housing and the actuator are provided with means for mounting the two together. The mounting means may include a frame rigidly connected to the valve housing and a plurality of bolts extending through the frame and threadedly connected to the actuator.

The travel stop of the subject invention includes a rigid coupling for joining the valve stem of the valve with the rotatable drive shaft of the actuator. The rigid coupling may be machined from a metal material and may include opposed first and second coupling ends. The first end may include means for non-rotatable coupling to the valve stem, while the second end may include means for non-rotatable coupling to the drive shaft of the actuator. Thus, rotation of the actuator drive shaft in response to an appropriate electrical or pneumatic signal will cause a corresponding rotation of the coupling which in turn is transmitted to the valve stem.

The coupling further includes first and second stop surfaces extending outwardly therefrom. The first and second stop surfaces may be defined on a flange unitarily molded or machined as part of the coupling. The stop surfaces are non-orthogonally aligned with respect to the rotational axis of the coupling, and may be radially aligned relative to the rotational axis. As explained further herein, the stop surfaces may be angularly aligned with respect to one another, and in a preferred embodiment define planes approximately orthogonally aligned relative to one another. The first and second stop surfaces of the coupling preferably define a short axial length to substantially minimize any increase in the overall dimensions of the actuated valve assembly due to the subject stop assembly.

The travel stop of the subject invention further includes first and second travel stops adjustably disposed intermediate the valve and the actuator and in proximity to the coupling. The adjustable first and second stops are disposed to engage the respective first and second stop surfaces of the coupling. The alignment and disposition of the respective first and second stops relative to the stop surfaces of the coupling may be selected to enable a full range of adjustment between the open and shut positions of the valving member to which the coupling is connected. In particular, the first adjustable stop may be disposed to engage the first stop surface of the coupling in the open position of the valving member, in the closed position of the valving member and at all points therebetween depending upon the particular adjusted position of the first adjustable stop. Similarly, the second adjustable stop is disposed to engage the second stop surface of the coupling in the fully shut position of the valving member, the fully open position of the valving member and at all points therebetween depending upon the particular adjusted position of the second adjustable stop. Additionally, first and second adjustable stops preferably are aligned to avoid significant bending moments thereon in response to contact with the corresponding first and second stop surfaces of the coupling. To achieve these objectives, the respective first and second adjustable stops are angularly aligned to one another and preferably are orthogonally aligned to one another.

The adjustable first and second stops may define threaded bolts or set screws threadedly engaged with at least one support plate rigidly disposed relative to the valve housing and the actuator. In particular, a support plate may be rigidly mounted intermediate the valve housing and the actuator. The support plate may include threaded holes for threaded engagement with the first and second adjustable stops. The support plate may be generally planar, and the threaded holes may extend generally parallel to the plane of the support plate.

In a preferred embodiment, as explained and illustrated further below, the support plate may include an aperture to substantially surround the coupling. The first and second adjustable stops may project into the aperture of the support plate for adjustable engagement with the corresponding first and second stop surfaces of the coupling. With this construction, the operative components of the travel stop are substantially enclosed by the support plate to prevent an accumulation of dirt and debris that could otherwise affect the accuracy of the travel stop and the associated valve.

DETAILED DESCRIPTION OF THE PREFERRED EMBODIMENT

Figure 1:
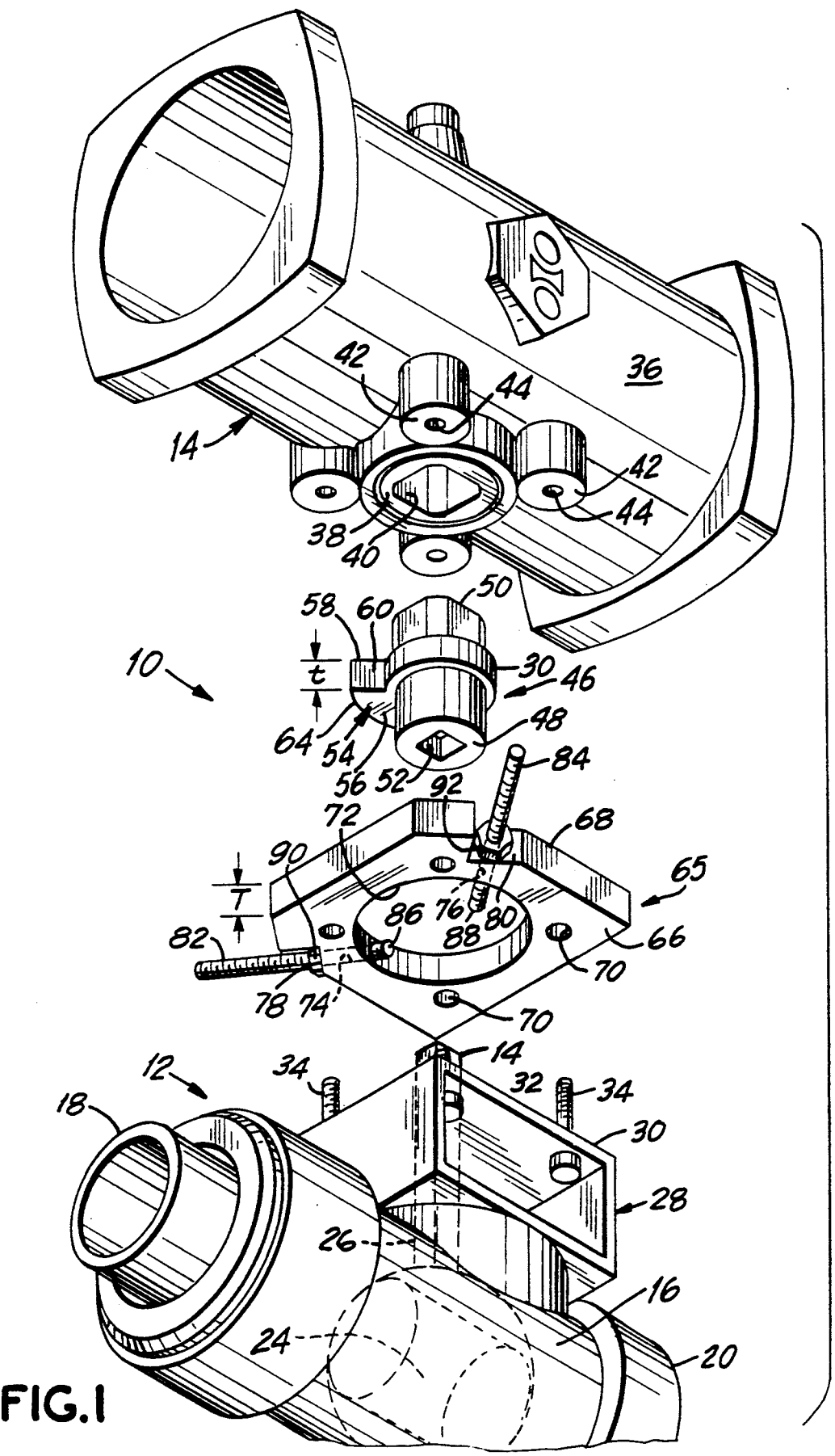
FIG. 1 is an exploded perspective view of the travel stop assembly of the subject invention employed with a valve and actuator.
Figure 2:
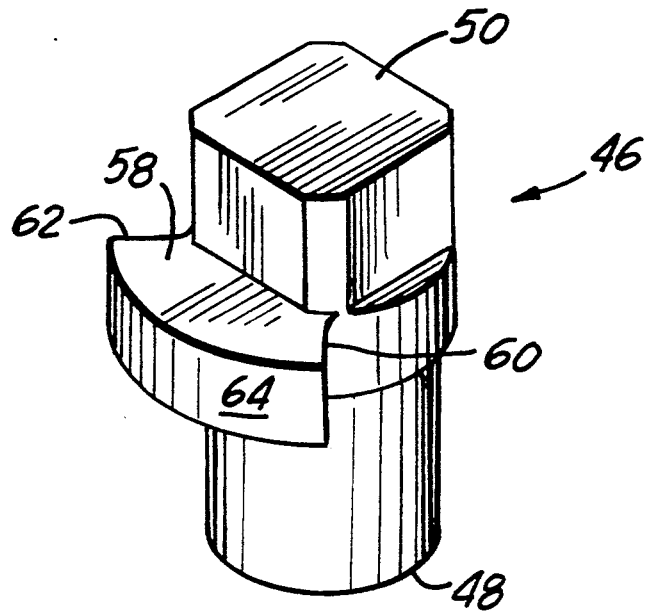
FIG. 2 is a perspective view of the coupling of the subject travel stop assembly.
Figure 3:
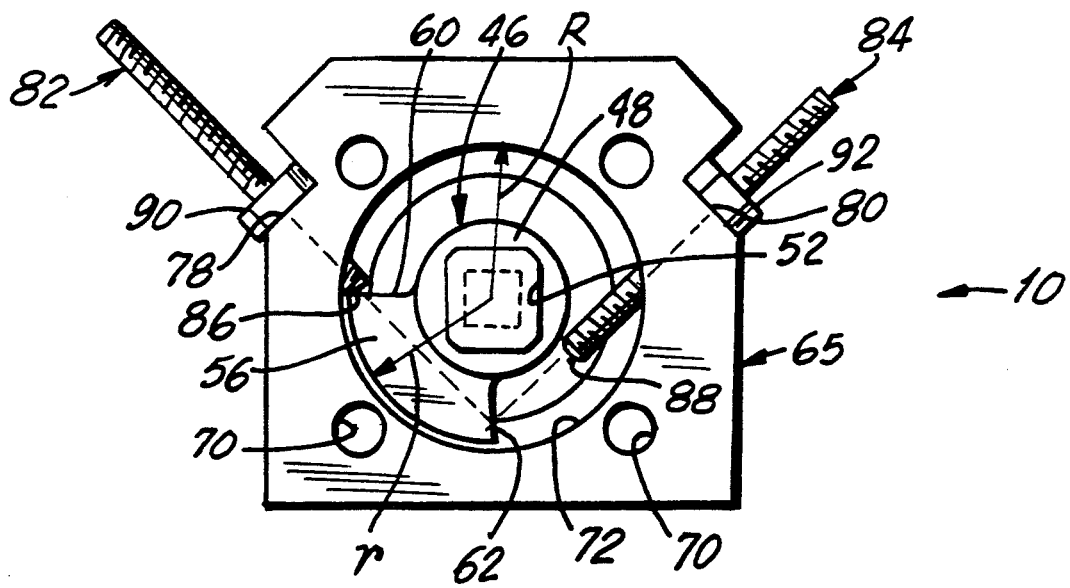
FIG. 3 is a bottom plan view of the travel stop assembly.

The travel stop assembly of the subject invention is identified generally by the numeral 10 in FIGS. 1-3. The travel stop assembly 10 is intended for use with a valve 12 and an actuator 14 both of which are illustrated in FIG. 1. It is to be understood that both the valve 12 and the actuator 14 may take many forms other than those illustrated herein. Generally a valve 10 used with the subject travel stop assembly 10 includes a housing 16 having opposed first and second ends 18 and 20 and a flow passage 22 extending therebetween. A valving member 24 is rotatably mounted in the housing 16 of the valve 12 between the opposed ends 20 and 22 thereof. The valving member 24 is rigidly connected to a stem 26 which extends through the housing 16. An actuator mounting bracket 28 is rigidly mounted to the valve housing 16 in proximity to the valve stem 26. As illustrated herein, the actuator mounting bracket 28 is provided with a planar support 30 having an aperture 32 extending therethrough and disposed substantially in register with the valve stem 26. A plurality of bolts 34 extend through the planar support surface 30 of the actuator mounting bracket 28 for threaded connection to the actuator 14 as explained further herein.

As noted above the valve 12 illustrated in FIG. 1 is only one of many valve configurations that may be employed with the travel stop assembly 10. In particular, the valve 12 is illustrated in FIG. 1 is a ball valve. The travel stop assembly described herein may also be used with butterfly valves or with ball valves of different configurations. Furthermore, the actuator mounting bracket 28 may take many other forms to enable mounting of the actuator 14 to the valve.

The actuator 14 shown in FIG. 1 again is one of many optional actuators that may employed with the travel stop assembly 10 of the subject invention. The actuator 14 illustrated schematically in FIG. 1 is a pneumatically powered actuator. The actuator 14 illustrated in FIG. 1 includes a housing 36 having a rotatable drive shaft 38 projecting therefrom. The rotatable drive shaft 38 of the actuator 14 is provided with a non-round aperture 40 extending therein. The shaft 38 is rotatable in response to an appropriate application of pneumatic pressure to the actuator 14. Other actuators will include a similar shaft that is rotatable in response to an electrical signal. The non-round aperture 40 extending into the actuator drive shaft 38 is intended to be coupled to the valve stem 26 of the valve 12 such that the rotation of the actuator drive shaft 38 can be transmitted to the valve stem 26 for moving the valving member 24 and thereby operating the valve 12. The actuator housing 36 is provided with a plurality of supports 42 in proximity to the actuator drive shaft 38. The supports 42 include threaded apertures 44 extending therein. The threaded apertures 44 are disposed and dimensioned to register with the bolts 34 on the actuator mounting bracket 28 of the valve 12. In this manner, the actuator 14 can be secured to the actuator mounting bracket 28 and with the actuator shaft 38 registered with the valve stem 26.

The travel stop assembly 10 includes a coupling 46 having opposed first and second longitudinal ends 48 and 50. The first end 48 of the coupling 46 includes a non-round aperture 52 extending therein. The aperture 52 is configured to non-rotatably mate with the valve stem 26 such that rotational forces applied to the coupling 46 can be transmitted to the valve stem 26. As shown herein the aperture 50 and the valve stem 26 both are of substantially rectangular cross-sectional configuration. However, other non-round shapes can be employed for transmitting rotation between the coupling 46 and the valve stem 26. The second end 50 of the coupling 46 also is non-round and is configured to non-rotatably mate with the aperture 40 in the actuator shaft 38. Thus, rotation of the actuator shaft 38 will be transmitted to the coupling 46 and then to the valve stem 26. As illustrated herein, both the aperture 40 in the actuator shaft 38 and the second end 50 of the coupling 46 are of generally square configuration with truncated corners. However, other non-round shapes can be employed for transmitting rotation therebetween.

The coupling 46 is further provided with a flange 54 extending outwardly therefrom at a location intermediate the opposed ends 48 and 50 of the coupling 46. The flange 54 includes substantially parallel opposed first and second surfaces 56 and 58 which are aligned substantially orthogonal to the axis of rotation of the coupling 46. The opposed parallel surfaces 56 and 58 of the coupling 46 are spaced from one another by a distance "t" which defines a thickness for the flange 54. The flange 54 is further characterized by first and second stop surfaces 60 and 62 which are angularly aligned to one another and which are disposed in generally radially extending planes passing through the axis of rotation of the coupling 46. As illustrated herein, the stop surfaces 60 and 62 are aligned orthogonal to one another. An outer circumferential surface 64 extends between and connects the stop surfaces 60 and 62. The outer circumferential surface 64 defines a radius "r" about the axis of rotation of the coupling 46 as illustrated in FIG. 3.

The travel stop assembly 10 further includes a support plate 65. As illustrated herein, the support plate 65 is substantially planar and includes opposed first and second surfaces 66 and 68 defining a thickness "T" substantially equal to or slightly greater than the thickness "t" of the flange 54 on the coupling 46. The support plate 65 includes a plurality of mounting apertures 70 extending entirely therethrough from the first surface 66 to the second surface 68 thereof. The apertures 70 are disposed to be in register with the bolts 34 passing through the mounting bracket 28 of the valve 12 and to be in register with the apertures 44 in the supports 42 of the actuator 14. The support plate 65 further includes a central aperture 72 extending therethrough from the first surface 66 to the second surface 68 thereof. As illustrated herein, the central aperture 72 is substantially circular and defines a radius "R" which is slightly greater than the radius "r" defined by the outer circumferential surface 64 of the flange 54 on the coupling 46. Thus, the coupling 46 can freely rotate within the central aperture 72 of the support plate 65.

The support plate 65 is further provided with first and second threaded holes 74 and 76 extending therethrough generally parallel to the plane of the support plate 65 and intermediate the opposed first and second surfaces 66 and 68 thereof. The threaded holes 74 and 76 extend from external edge regions of the support plate 65 into the central aperture 72. As illustrated herein the threaded holes 74 and 76 are aligned such that their respective center lines intersect at a location within the central aperture 72 of the support plate 65. Furthermore, in the preferred illustrated embodiment shown most clearly in FIG. 3, the center lines of the respective threaded holes 74 and 76 are orthogonal to one another and enter the central aperture 72 of the support plate 65 at substantially diametrically opposed locations. Thus, the center lines of the respective threaded holes 74 and 76 intersect one another at locations approximately 90° separated from the respective diametrically opposed locations at which the threaded holes 74 and 76 enter the central aperture 72 of the support plate 65. The external edge regions of the support plate 65 adjacent to the respective threaded holes 74 and 76 are aligned substantially orthogonal to the axes of the respective threaded apertures 74 and 76 to define locking surfaces 78 and 80.

Threaded bolts 82 and 84 are threadedly engaged in the threaded holes 74 and 76 respectively. The bolts 82 and 84 have leading ends 86 and 88 respectively which can be advanced or withdrawn with respect to the threaded holes 74 and 76. At relatively withdrawn positions, the leading ends 86 and 88 of the bolts 82 and 84 are within the support plate 65. At more advanced positions the leading ends 86 and 88 are within the circular aperture 72. The bolts 82 and 84 can be threadedly advanced or withdrawn independently of one another. In fully advanced positions of each bolt 82 and 84, the leading ends 86 and 88 of the bolts 82 and 84 will intersect one another at a location approximately 90° separated from the respective diametrically opposed entrances of the threaded holes 74 and 76 into the central aperture 72 of the support plate. Alternatively, either bolt 82 or 84 can be threadedly advanced independently of the other bolt until the respective leading end 86 or 88 thereof contacts an internal edge region of the central aperture 72 that is approximately 90° separated from the corresponding entry of the threaded aperture 74 or 76 into the central aperture 72. Lock nuts 90 and 92 are threadedly engaged on the respective bolts 82 and 84 at locations external of the support plate 65. The lock nuts 90 and 92 will engage the respective locking surfaces 78 and 80 to lockingly retain the bolts 82 and 84 in selected threadedly advanced positions relative to the support plate 65.

The travel stop assembly 10 is employed by mounting the first end 48 of the coupling 46 to the valve stem 26 by telescoping the aperture 52 in the first end 48 of the coupling over the valve stem 26. In view of the rectangular cross-sectional configuration of the valve stem 26 and aperture 52, the coupling 46 is non-rotatably engaged with the valve stem 26 and rotation of the coupling 46 about its longitudinal axis will generate a corresponding rotation of the valve stem 26 and the valving member 24 disposed within the valve housing 16.

The support plate 65 is then mounted to the mounting bracket 28 of the valve 12 by passing the bolts 34 through the apertures 70 in the support plate 65. The surface 66 of the support plate 65 will then be engaged on the planar support surface 30 of the mounting bracket 28. Additionally, the central aperture 72 in the support plate 65 will be substantially registered with the aperture 32 in the mounting bracket 28. Furthermore, the flange 54 of the coupling 46 will be disposed within the central aperture 72 of the support plate 65. As noted above, the radius defined by the outer circumferential surface 64 of the flange 54 is less than the radius "R" of the central aperture 72 in the support plate 65. Thus, depending upon the relative positions of the bolts 82 and 84, the coupling 46 will be able to rotate within the central aperture 72 of the support plate 65.

The actuator 14 is then mounted to the valve 12 and the travel stop assembly 10. In particular, the apertures 44 in the supports 42 of the actuator housing 36 can be registered with and threadedly engaged with mounting bolts 34 which pass through the aperture 70 in the support plate 65. In the fully mounted position, the supports 42 of the actuator will be securely supported on the support plate 65. Furthermore, the mounting of the actuator 14 onto the support plate 65 will urge the actuator shaft 38 into engagement with second end 50 of the coupling 46. In particular, the non-round second end 50 of the coupling 46 will be telescoped into the correspondingly non-round aperture 40 in the actuator shaft 38. As a result, rotation of the actuator shaft 38 about its axis will generate a corresponding rotation of the coupling 46 about its axis and a further rotation of the valve stem 26 about its axis.

As noted above, the construction of the valve housing 16 and the valve stem 26 generally will limit the rotation of the valve stem to a range of 90° from a fully open condition to a fully closed condition. The actuator 14 will rotatably drive the valve stem 26 until the maximum range of permitted motion is achieved. However, the travel stop assembly 10 enables the open stop position of the valving member 24 and the closed stop position of the valving member 24 to be varied by any selected amount within the 90° range of motion permitted by the construction of the valve housing 16 and the valve stem 26. More particularly, the bolts 82 and 84 can be threadedly advanced such that the leading ends 86 and 88 thereof enter into the central aperture 72 of the support plate 65 by selected amounts. The threaded advancement of the bolts 82 and 84 will cause the respective leading ends 86 and 88 thereof to engage the stop surfaces 60 or 62 respectively of the flange 54 on the coupling 46. This engagement of the leading ends 86 and 88 of the bolts 82 and 84 with the corresponding stop surfaces 60 and 62 will terminate the rotation of the coupling 46 short of the maximum possible rotation permitted by the construction of the valve housing 16 and the valve stem 24.

The bolts 82 and 84 are aligned to intersect one another within the central aperture 72. Consequently, rotation of the coupling 46 and the valve stem 26 can be adjusted for any maximum opened condition or any maximum closed position. This performance of the travel stop assembly 10 can be illustrated most clearly with respect to FIG. 3. In particular, the bolt 82 is depicted in FIG. 3 as being substantially completely withdrawn such that the leading end 86 thereof is aligned at a first diametrical entry point into the aperture 72. This diametrical entry point may correspond to a fully closed position of the valve 12. The bolt 84, is threadedly advanced such that the leading end 88 thereof is well inside the central aperture 72 of the support plate 65. In particular, the leading end 88 of the bolt 84 is angularly separated from the stop surface 62 of the coupling by approximately 45°. Thus, the coupling 46 can rotate only approximately 45° until the stop surface 62 thereof engages the leading end 88 of the bolt 84. This will correspond approximately to a half opening of the valve 12. It will appreciated that a further advancement of the bolt 84 could even further limit the maximum possible opening of the valve 12. Conversely, a further withdrawal of the bolt 84 will permit a greater opening of the valve. Of course, the bolt 82 could be advanced beyond the position depicted in FIG. 3 to prevent a complete closure of the valve and/or to precisely control the amount of closure from 0° to 90°.

In addition to the broad range of operational controls enabled by the travel stop assembly 10, several other advantages are achieved. In particular, the disposition of the travel stop assembly 10 intermediate the valve 12 and the actuator 14 does not add significantly to the overall dimensions of the valve 12 and actuator 14 assembly. In particular, the travel stop assembly 10 will add to the dimensions of the valve 12 and actuator 14 only by the thickness "T" of the base plate 16 which typically will be only 0.25–0.50 inch. Additionally, the travel stop assembly 10 does not require an in-field disassembly, retrofitting and reassembly of the actuator 14. Rather, the travel stop assembly 10 can readily be incorporated into a pipe system as part of the normal mounting of the actuator 14 on to the valve 12. Furthermore, in the embodiment depicted most clearly in FIGS. and 3, the base plate 65 completely encloses the flange 54 of the coupling and the leading ends 86 and 88 of the bolts 82 and 84. Thus, an accumulation of dirt or debris that conceivable could affect the operation of the travel stop assembly is substantially prevented. Additionally, the alignment of the bolts 82 and 84 substantially minimized bending moments imposed by the actuator.

While the invention has been described with respect to a preferred embodiment, it is apparent that various changes can be made without departing from the scope of the invention as defined by the appended claims. In particular, the valve and actuator depicted in the FIG. 1 is substantially schematic and is intended to be merely illustrative of the many types of valves and actuators that may be employed with the travel stop assembly. Additionally, the mounting means between the valve and the actuator can vary considerably from the illustrated embodiment. Similarly, the non-rotatable connections of the coupling to both the valve stem and the actuator shaft can vary considerably from the particular embodiment depicted herein. Still further, the configuration of the support plate and the flange can vary considerably and alignments of the bolts and stop faces can differ from the preferred orthogonal alignment depicted herein and described above. These and under changes will be apparent to the person skilled in the art after having read the subject disclosure.

I claim:

1. A travel stop assembly for an actuated valve, the actuated valve including a valve housing having a valving member disposed therein for selectively opening and closing the valve, the valve stem extending from the valving member for moving the valve member between an opened position and a closed position, an actuator having a rotatable drive shaft for rotatably driving the valve stem to selectively open and close the valve, the travel stop assembly enabling selective control of the amount of opening and closing of the valve and comprising:

a unitary coupling including opposed and first and second ends, the first end being non-rotatably coupled to the valve stem and the second end being non-rotatably coupled to the actuator drive shaft such that rotation of the actuator drive shaft rotatably drives the coupling and the valve stem, a flange unitarily defined on the coupling intermediate the opposed ends thereof, the flange including first and second stop surfaces defining planes extending generally radially outwardly from the rotational axis of the coupling, the stop faces of the flange being substantially orthogonal to one another, the flange having opposed end faces orthogonal to the rotational axis and defining a thickness measured along the rotational axis of the coupling;

a planar support plate having a central aperture extending therethrough and opposed planar parallel faces aligned orthogonal to the rotational axis of the coupling, the parallel faces of support plate defining a thickness equal to the thickness of the flange of the coupling, the support plate being rigidly mounted intermediate the valve and the actuator such that the flange of the coupling is rotatable within the central aperture of the support plate, the support plate including first and second threaded holes angularly aligned to one another in a common plane centrally between the parallel faces of the coupling and extending from edge regions on the support plate into the central aperture thereof; and first and second bolts threadedly engaged in the threaded holes of the support plate, the first and second bolts having respective first and second leading ends selectively advanceable and retractable into the central aperture of the support plate for engaging the stop surfaces of the flange on the actuator centrally between the opposed end faces of the flange, whereby rotation of the coupling can be limited by engagement of the first and second stop faces of the cam with the respective first and second leading ends of the bolts, the bolts being threadedly adjusted in the support plate for controlling the limits of rotation of the coupling and the amount of opening and closing of the valve.

2. A travel stop assembly as in claim 1, wherein the support plate defined a thickness of less than approximately one-half inch.

3. A travel stop assembly as in claim 1, wherein the first and second bolts enter the central aperture of the support plate at substantially diametrically opposed locations relative to the rotational axis of the coupling.

4. A travel stop assembly as in claim 3, wherein the bolts are substantially orthogonally aligned relative to one another for intersection with one another at a location within the central aperture of the support plate in fully advanced positions of the respective bolts.

* * * * *